Nov. 17, 1970 R. L. JAMES 3,541,319
APPARATUS HAVING INFINITE MEMORY FOR SYNCHRONIZING AN INPUT SIGNAL TO THE OUTPUT OF AN ANALOG INTEGRATOR
Filed Dec. 21, 1967
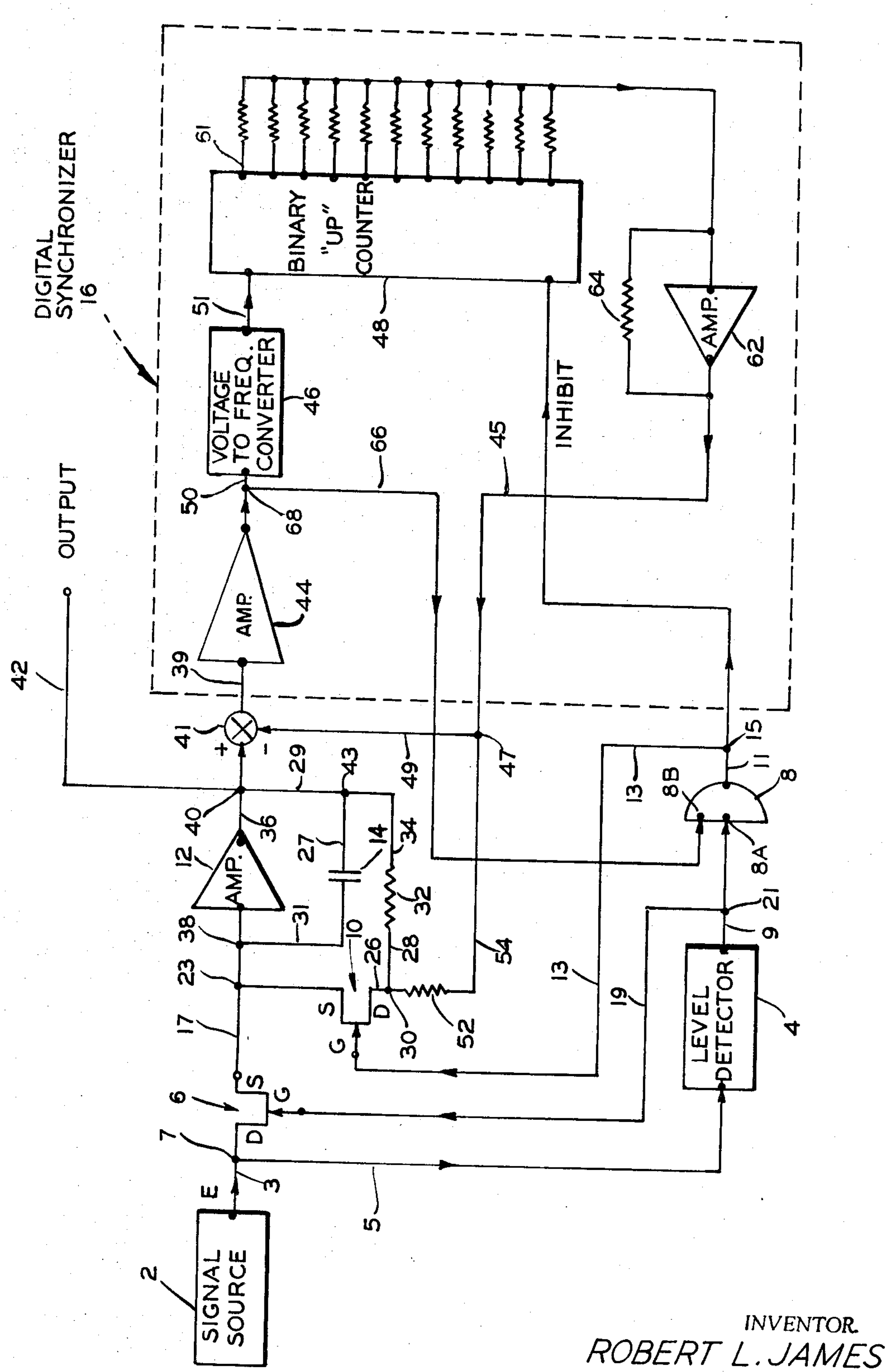
INVENTOR.
ROBERT L. JAMES
BY Anthony J. Cusco
ATTORNEY United States Patent Office 3,541,319

Patented Nov. 17, 1970

3,541,319

APPARATUS HAVING INFINITE MEMORY FOR SYNCHRONIZING AN INPUT SIGNAL TO THE OUTPUT OF AN ANALOG INTEGRATOR

Robert L. James, Bloomfield, N.J., assignor to The Bendix Corporation, a corporation of Delaware Filed Dec. 21, 1967, Ser. No. 692,340
Int. Cl. G06g *7/18;* G06f *7/46*
U.S. Cl. 235—183 6 Claims

ABSTRACT OF THE DISCLOSURE

Apparatus including a digital synchronizer for synchronizing an input signal to the output of an analog integrator. When the input signal is zero, the digital synchronizer causes the analog integrator to hold indefinitely at its last value thus imparting infinite memory to the integrator. When the input signal is other than zero, the output of the integrator is the step-free continuous output of a typical analog integrator.

BACKGROUND OF THE INVENTION

Description of the prior art

Digital integrators having infinite memory now known in the art have a stepwise incremental output rather than the more desirable continuous output. Integrators of this type are susceptible to electrical noise disturbrances and employ bi-directional rather than unidirectional counters, and which bi-directional counters have an increased number of components with an associated decrease in reliability.

SUMMARY OF THE INVENTION

The device of the present invention contemplates an analog integrator with infinite memory including a level detector for sensing when an input signal is other than zero and which level detector is thereupon rendered effective for closing a switch and for rendering a gate effective for opening another switch. When the other switch is open, an operational amplifier integrates the input signal and the integrated signal is applied to a digital synchronizer. When the input signal is zero, the level detector is effective for opening the first mentioned switch and when the synchronizer completes a final synchronization to the held output of the operational amplifier the gate closes the other switch so that the operational amplifier becomes a unity gain amplifier driven by the output of the synchronizer, and which output is equal to the last output of the operational amplifier. The digital synchronizer is then inhibited from operating and remains at its last value.

One object of this invention is to provide an integrator having infinite memory.

Another object of this invention is to provide an integrator having a continuous output as opposed to a stepwise incremental output.

Another object of this invention is to provide an integrator of the type described and having reduced susceptibility to electrical noise disturbances.

Another object of this invention is to use a unidirectional counter type digital synchronizer for imparting infinite memory to an analog integrator.

Another object of this invention is to provide a novel combination of digital and analog apparatus for providing an integrator with infinite memory.

Another object of this invention is to provide an integrator having a reduced number of components and increased reliability.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The single figure in the drawing is an electrical schematic diagram of an integrator according to the invention.

DESCRIPTION OF THE INVENTION

A signal source 2 provides at an output conductor 3 a direct current or demodulated alternating current signal E such as may be used, for purposes of illustration, in a flight control system. Signal E from signal source 2 is applied through conductor 3 and a conductor 5 joining conductor 3 at a point 7 to a level detector 4, and which level detector 4 senses when signal E is other than zero and thereupon provides at an output conductor 9 a signal at a logic "one" level. The signal from level detector 4 is applied through conductor 9 to an input 8A of a gate 8, and which gate 8 has another input 8B. Gate 8 provides a logic "zero" signal at conductor 11 in response to logic "zero" input at conductor 8A, conductor 8B carrying a logic "one" level in this respect it is to be noted that both inputs 8A and 8B of gate 8 must receive a logic "zero" signal in order for the gate to provide a signal at a logic "one" level as well be hereinafter explained.

The logic "one" signal generated by level detector 4 in response to an input signal is applied through a conductor 19 joining conductor 9 at a point 21 to the gate element of a normally non-conductive unipolar field effect transistor 6, and which transistor 6 is rendered conductive and has a drain element connected to output conductor 3 of signal source 2 at point 7 and a source element connected through a conductor 17 to an operational amplifier 12.

The signal from gate 8 is applied through a conductor 13 joining conductor 11 at a point 15 to the gate element of a normally conductive unipolar field effect transistor 10, and which transistor 10 has a source element connected to conductor 17 leading to amplifier 12 at a point 23 and a drain element connected to an output conductor 36 of amplifier 12 through a conductor 26, a conductor 28 joining conductor 26 at a point 30, a resistor 32 and a conductor 34 joining output conductor 36 at a point 40.

An integrating capacitor 14 has one plate connected to input conductor 17 or amplifier 12 through a conductor 31 joining conductor 17 at a point 38 and the other plate connected to output conductor 36 of amplifier 12 through a conductor 27 and a conductor 29 joining conductor 27 at a point 43 and joining output conductor 36 at point 40. A network output conductor 42 is connected at point 40 to output conductor 36 of amplifier 12.

As mentioned before the logic "one" signal from level detector 4 renders transistor 6 conductive and the logic "zero" signal from gate 8 renders transistor 10 non-conductive so that amplifier 12 is effective as an analog integrator for integrating input signal E. The integrated signal at output conductor 36 of amplifier 12 is applied through conductor 36 to a summation means 41 and summed thereat with a feedback signal from a digital synchronizer 16, and which feedback signal is applied to summation means 41 through a conductor 49 joining an output conductor 45 of synchronizer 16 at a point 47 and leading therefrom to summation means 41.

It will now be understood that as long as transistor 6 is conductive and transistor 10 is non-conductive, the signals at conductors 36 and 49, and which signals are applied to summation means 41, cancel out so that the output of summation means 41 is zero. When transistor 6 is rendered non-conductive as will hereinafter be explained so that signal source 2 and amplifier 12 are disconnected, the output of amplifier 12 holds to its last value so that an error signal is provided at the output of summation means 41 corresponding to the difference between said amplifier output and the output from synchronizer 16 at output conductor 49. The error signal is synchronized to some predetermined synchronizing instant, i.e., the instant that transistor 6 is rendered non-conductive. In this respect the device of the invention is similar to the integrator/synchronizer disclosed and claimed in U.S. application Ser. No. 558,327, filed June 17, 1966 by Robert L. James and assigned to The Bendix Corporation, assignee of the present invention.

Synchronizer 16 includes an amplifier 44 connected through a conductor 39 to summation means 41. When an error signal occurs at summation means 41, amplifier 44, having a discrete gain provides at an output conductor 50 a signal corresponding to the time integral input signal E. A voltage to frequency converter 46 is connected to amplifier 44 through conductor 50 and is driven by amplifier 44 so as to provide at an output conductor 51 pulses having a frequency corresponding to the output of amplifier 44. A binary "up" counter 48 is connected to voltage to frequency converter 46 through conductor 51 and provides at a plurality of output conductors 61 a digital output corresponding to the total number of pulses from voltage to frequency converter 46.

Except for the fact that binary counter 48 is an "up" counter only, it is otherwise similar to the counter described in the aforenoted copending U.S. application Ser. No. 558,327, and which counter has an input from a voltage to frequency converter and an input from an inhibiting device as does the counter of the present invention.

An amplifier 62 having a resistor 64 connected in feedback relation thereto and connected to output conductors 61 of counter 48 provides at output conductor 45 an analog output in response to the digital output from counter 48 and which analog output is applied to the drain element of transistor 10 through a conductor 54 joining conductor 45 at junction point 47, and through resistor 52 and conductor 26.

In reality then, amplifier 62 functions as a digital to analog converter and for this purpose includes circuitry such as shown and described in the aforenoted copending U.S. application Ser. No. 558,327.

When input signal E next goes to zero (where a true integrator should hold its output indefinitely) level detector 4 provides at output conductor 9 a logic "zero" signal, which logic "zero" signal is applied through output conductor 9 and conductor 19 joining conductor 9 at point 21 to the gate of field effect transistor 6 so as to render transistor 6 nonconductive. The logic "zero" signal is also applied through conductor 9 to inpunt 8A of gate 8.

Field effect transistor 10, rendered nonconductive by the logic "zero" signal from gate 8, as heretofore noted, remains nonconductive until synchronized 16 completes a final synchronization to the held output of amplifier 12. Thus, when the output from summation means 41 is zero, amplifier 44 provides a level "zero" analog output at output conductor 50. The "zero" level output signal is applied through conductor 50 and a conductor 66 joining conductor 50 at a point 68 to the input 8B of gate 8. Gate 8, having now received "zero" signals at both inputs 8A and 8B thereof provides a logic "one" signal at output conductor 11, and which logic "one" signal is applied through conductor 11 and conductor 13 joining conductor 11 at point 15 to the gate of transistor 10 for rendering transistor 10 conductive, and whereby amplifier 12 is converted into a unity gain amplifier driven by the analog output from amplifier 62 of synchronizer 16. The output of synchronizer 16 at this time is equal to the last value provided by amplifier 12 at output conductor 36 thereof.

The logic "one" signal from gate 8 at output conductor 11 thereof is applied through conductor 11 to counter 48 for inhibiting operation of counter 48 and which counter provides at output conductors 61 thereof a digital output corresponding to the last value of the signal provided by amplifier 12. Since counter 48 is inhibited from responding to any additional inputs, it will hold its output with infinite memory. When signal E assumes a level different from zero, amplifier 12 functions as an analog integrator as heretofore explained.

It may thus be seen that the device of the present invention provides a novel combination of digital and analog apparatus for realizing the advantages of each in an integrating operation. Moreover, a simple unidirectional counter type digital synchronizer is used to impart infinite memory to an analog integrator so as to provide an integrator having a reduced number of components and hence greater reliability.

Although but a single embodiment of the invention has been illustrated and described in detail, it is to be expressly understood that the invention is not limited thereto, for example, while a digital synchronizer has been used to impart infinite memory to an analog integrator, in a similar manner it could be used to provide infinite memory for other devices. Various changes may also be made in the design and arrangement of the parts without departing from the spirit and scope of the invention as the same will now be understood by those skilled in the art.

What is claimed is:

1. An electrical network comprising:

a signal source having an output element and providing a network input signal thereat;

a level detector having an input element connected to the output element of the signal source and responsive ot the input signal for providing at an output element a first controlling output when the input signal is zero and a second controlling output when the input signal is other than zero;

an analog integrator including an amplifier having input and output elements and a capacitor connected in feedback relation to said elements;

a normally open switch including an input element connected to the signal source output element, an output element connected to the amplifier input element, and a control element connected to the level detector output element, said switch being closed by the first controlling output for applying the input signal to the amplifier to provide an integrated signal at the amplifier output element and said switch being opened by the second controlling output to provide an output at the amplifier output element which holds at the last value of the integrated signal.

2. A network as described by claim 1, including comprising:

apparatus as described by claim 1, including a digital synchronizer for synchronizing to the held output of the integrator amplifier, and summing means connected to the analog integrator and to the synchronizer for summing the signals therefrom.

3. A network as described in claim 2, including:

an amplifier having an input element connected to the summing means for amplifying the summation signal therefrom and for providing an amplified summation signal at an output element;

a voltage to frequency converter having an input element connected to the amplifier output element for providing pulses at a frequency corresponding to the amplified signal at an output element;

a counter having a first input element connected to the converter for converting the pulses therefrom to a digital output and for providing said digital output at an output element;

a digital to analog converter having an input element connected to the output element of the counter for converting the digital output therefrom to an analog signal and for providing said analog signal at an output element;

gating means having a first input element connected to the level detector, a second input element connected to the output element of the synchronizer amplifier and an output element, and responsive to the synchronizer amplifier output and to the second controlling signal for providing a third controlling signal, and responsive to the synchronizer amplifier output when the synchronizer completes synchronization to the held output of the integrator amplifier and to the first controlling signal for providing a fourth controlling signal; and a normally closed switch having an input element connected to the digital to analog converter output element, an output element connected intermediate the output element of the first switch and the integrator amplifier input element and a control element connected to the output element of the gate, and opened by the third controlling output, and closed by the fourth controlling output for effectively driving the integrator by the output of the synchronizer equal to the last value of said amplifier output.

4. An electrical network comprising:

a signal source having an output element and providing a network input signal thereat;

a level detector having an input element connected to the output element of the signal source and responsive to the input signal for providing at an output element a first controlling output when the input signal is zero and a second controlling output when the input signal is other than zero;

an analog integrator including an amplifier having input and output elements and a capacitor connected in feedback relation to said elements;

a normally open first switch including an input element connected to the signal source output element, an output element connected to the amplifier input element, and a control element connected to the level detector output element, said switch being closed by the first controlling output for applying the input signal to the amplifier to provide an integrated signal at the amplifier output element and said switch being opened by the second controlling output to provide an output at the amplifier output element which holds at the last value of the integrated signal;

summing means having a first input element connected to the integrator amplifier, a second input element and an output element;

another amplifier having an input element connected to the output element of the summing means for amplifying the signal from said summing means;

a voltage to frequency converter having an input element connected to the amplifier output element for providing pulses at a frequency corresponding to the amplied signal at an output element;

a counter having a first input element connected to the converter for converting the pulses therefrom to a digital output and for providing said digital output at an output element;

a digital to analog converter having an input element connected to the output element of the counter for converting the digital output therefrom to an analog signal and for providing said analog signal at an output element, and connected at said output element to the summing means;

gating means having a first input element connected to the level detector, a second input element connected to the output element of the other amplifier and an output element, and responsive to the other amplifier output and to the second controlling signal for providing a third controlling signal, and responsive to the other amplifier output when the output from the other amplifier is zero, signifying synchronization to the held output of the integrator amplifier, and to the first controlling signal for providing a fourth contrlling signal; and a normally closed second switch having an input element connected to the digital to analog converter output element, an output element connected intermediate the output element of the first switch and the integrator amplifier input element and a control element connected to the output element of the gate, and opened by the third controlling output, and closed by the fourth controlling output for effectively driving the integrator by the output of the digital to analog converter equal to the last value of said integrator amplifier output.

5. The network as described by claim 4, wherein:

the first normally open switch is a unipolar transistor having gate, source and drain elements;

the gate element is connected to the level detector output output element;

the drain element is connected to the signal source output element; and the source element is connected to the input element of the integrator amplifier.

6. The network as described by claim 4, wherein:

the normally closed second switch is a unipolar transistor having gate, source and drain elements;

the gate element is connected to the output element of the gating means;

the drain element is connected to the summing means and to the output element of the digital to analog converter; and the source element is connected intermediate the source element of the first switch and the integrator amplifier input element.

References Cited

UNITED STATES PATENTS

| | | | |
|---|---|---|---|
| 3,328,568 | 6/1967 | Masel | 235—183 |
| 3,376,431 | 4/1968 | Merrel | 307—229 |
| 3,404,857 | 10/1968 | Tippetts | 235—183 X |

EUGENE G. BOTZ, Primary Examiner

F. D. GRUBER, Assistant Examiner

U.S. Cl. X.R.

235—92, 150.51; 307—229; 328—151; 340—347